(12) United States Patent
Tasaki et al.

(10) Patent No.: US 10,916,018 B2
(45) Date of Patent: Feb. 9, 2021

(54) CAMERA MOTION ESTIMATION DEVICE, CAMERA MOTION ESTIMATION METHOD, AND COMPUTER PROGRAM PRODUCT

(71) Applicant: Kabushiki Kaisha Toshiba, Minato-ku (JP)

(72) Inventors: Tsuyoshi Tasaki, Yokohama (JP); Tomoki Watanabe, Inagi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/911,238

(22) Filed: Mar. 5, 2018

(65) Prior Publication Data
US 2019/0050995 A1     Feb. 14, 2019

(30) Foreign Application Priority Data

Aug. 9, 2017 (JP) ................. 2017-154275

(51) Int. Cl.
*G06K 9/00* (2006.01)
*G06T 7/215* (2017.01)
(Continued)

(52) U.S. Cl.
CPC ............ *G06T 7/215* (2017.01); *G06T 1/0007* (2013.01); *G06T 7/246* (2017.01); *H04N 5/341* (2013.01);
(Continued)

(58) Field of Classification Search
CPC ................. G06T 2207/10016; G06T 7/215
See application file for complete search history.

(56) References Cited

U.S. PATENT DOCUMENTS

| 5,946,041 A | 8/1999 | Morita | |
|---|---|---|---|
| 2012/0027258 A1* | 2/2012 | Uchida | ................... G06T 7/20 382/103 |

(Continued)

FOREIGN PATENT DOCUMENTS

| JP | 9-214945 | 8/1997 |
|---|---|---|
| JP | 2008-89314 A | 4/2008 |
| JP | 2010-157093 A | 7/2010 |

OTHER PUBLICATIONS

Jurandy Almeida, et al., "Robust Estimation of Camera Motion Using Optical Flow Models", ISVC 2009, Part I, LNCS 5875, 2009, pp. 435-446.

(Continued)

*Primary Examiner* — Oneal R Mistry
(74) *Attorney, Agent, or Firm* — Oblon, McClelland, Maier & Neustadt, L.L.P.

(57) ABSTRACT

According to an embodiment, a camera motion estimation device includes a memory and one or more hardware processors configured to function as a first acquisition unit, a second acquisition unit, and an estimation unit. The first acquisition unit is configured to acquire feature point correspondence information indicating correspondence between feature points included in time series images. The second acquisition unit is configured to acquire pixel flow information indicating a locus of a pixel included in the time series image. The estimation unit is configured to estimate a motion of a camera that has captured the time series images, using the pixel flow information and the feature point correspondence information.

16 Claims, 7 Drawing Sheets

(51) Int. Cl.
*G06T 7/246* (2017.01)
*H04N 19/43* (2014.01)
*H04N 19/513* (2014.01)
*G06T 1/00* (2006.01)
*H04N 5/341* (2011.01)
*G06N 3/02* (2006.01)

(52) U.S. Cl.
CPC ........... *H04N 19/43* (2014.11); *H04N 19/513* (2014.11); *G06N 3/02* (2013.01); *G06T 2207/10016* (2013.01); *G06T 2207/20084* (2013.01); *G06T 2207/30244* (2013.01)

(56) References Cited

U.S. PATENT DOCUMENTS

| | | | | |
|---|---|---|---|---|
| 2015/0341633 | A1* | 11/2015 | Richert | H04N 19/50 375/240.16 |
| 2017/0032514 | A1* | 2/2017 | Zhang | G06K 9/00771 |
| 2017/0339431 | A1* | 11/2017 | Zhang | H04N 19/159 |
| 2018/0288303 | A1* | 10/2018 | Wang | H04N 5/232 |
| 2018/0293454 | A1* | 10/2018 | Xu | G06K 9/627 |
| 2018/0295375 | A1* | 10/2018 | Ratner | H04N 19/436 |
| 2019/0114793 | A1* | 4/2019 | Chen | G06T 7/38 |

OTHER PUBLICATIONS

Elisavet K. Stathopoulou, et al., "Prior Knowledge About Camera Motion for Outlier Removal in Feature Matching", VISAPP 2015, International Conference on Computer Vision Theory and Applications, pp. 603-610.

Denis Fortun, et al., "Computer Vision and Image Understanding", Elsevier, 134, 2015, 21 pages.

Andreas Wedel, et al., "Optical Flow Estimation", Chapter 2, Stereo Scene Flow for 3D Motion Analysis, 201131 pages.

Chen Qian, et al., "Monocular Optical Flow Navigation Using Sparse SURF Flow with Multi-Layer Bucketing Screener" Proceedings of the 34th Chinese Control Conference (CCC), USA, IEEE, URL, https://ieeexplore.ieee.org/stamp/stamp.jsp?tp=$arnumber=7260225, Jul. 30, 2015, pp. 3785-3790.

* cited by examiner

CAMERA MOTION ESTIMATION DEVICE, CAMERA MOTION ESTIMATION METHOD, AND COMPUTER PROGRAM PRODUCT

CROSS-REFERENCE TO RELATED APPLICATIONS

This application is based upon and claims the benefit of priority from Japanese Patent Application No. 2017-154275, filed on Aug. 9, 2017; the entire contents of which are incorporated herein by reference.

FIELD

Embodiments described herein relate generally to a camera motion estimation device, a camera motion estimation method, and a computer program product.

BACKGROUND

The position and posture of a camera mounted on a moving object or the like are changed according to a motion of the moving object. A technique of estimating the position and posture of a camera mounted on a moving object or the like, using an image captured by the camera, is conventionally known. For example, a technique of estimating a motion of a camera, using the epipolar constraint, from a correspondence relationship between feature points included in a plurality of images, is conventionally known.

However, in the conventional techniques, improvement of estimation accuracy of the camera motion is difficult in a case where many similar patterns exist in the images. For example, in a scene where many objects exist, such as walls that are difficult to cut out as one object in an image, improvement of the estimation accuracy of the camera motion is difficult.

DETAILED DESCRIPTION

According to an embodiment, a camera motion estimation device includes a memory and one or more hardware processors configured to function as a first acquisition unit, a second acquisition unit, and an estimation unit. The first acquisition unit is configured to acquire feature point correspondence information indicating correspondence between feature points included in time series images. The second acquisition unit is configured to acquire pixel flow information indicating a locus of a pixel included in the time series image. The estimation unit is configured to estimate a motion of a camera that has captured the time series images, using the pixel flow information and the feature point correspondence information.

Hereinafter, a camera motion estimation device, a camera motion estimation method, and a computer program product of an embodiment will be described with reference to the appended drawings.

A camera motion estimation device according to the embodiment is mounted on, for example, a moving object.

Example of Moving Object

Figure 1:
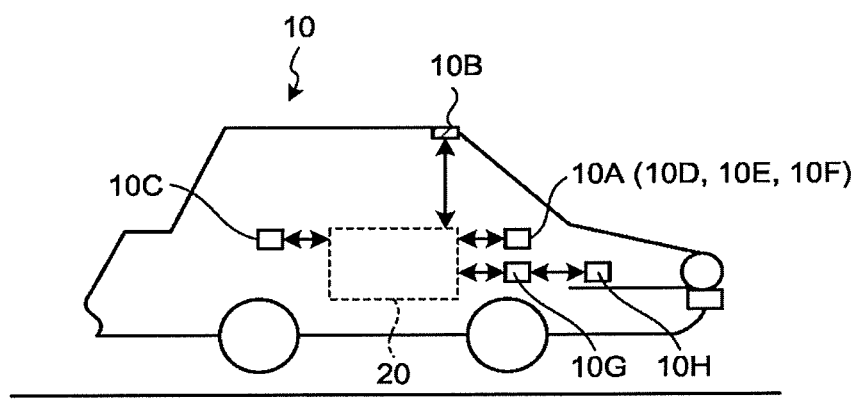
FIG. 1 is a diagram illustrating an example of a moving object according to an embodiment.

FIG. 1 is a diagram illustrating an example of a moving object 10 of the embodiment.

The moving object 10 includes a camera motion estimation device 20, an output unit 10A, a camera 10B, a sensor 10C, a power control unit 10G, and a power unit 10H.

The moving object 10 may be arbitrary. The moving object 10 is a vehicle, a bogie, a robot, or the like. The vehicle is a motorcycle, an automobile, a bicycle or the like. Further, the moving object 10 may be a moving object that travels via a driving operation by a person, or a moving object that can automatically travel (autonomously travel) without a driving operation by a person, for example.

The camera motion estimation device 20 is realized by, for example, a dedicated or general purpose computer.

Note that the camera motion estimation device 20 is not limited to the mounted on the moving object 10. The camera motion estimation device 20 may be mounted on a stationary object. A stationary object is a non-movable object such as an object fixed to the ground, for example. The stationary object fixed to the ground is a guard rail, a pole, a parked vehicle, or a road sign. Further, for example, the stationary object is an object in a state of being stationary with respect to the ground. In addition, the camera motion estimation device 20 may be mounted on a cloud server that executes processing on a cloud system.

The power unit 10H is a drive device mounted on the moving object 10. The power unit 10H is an engine, a motor, a wheel, or the like.

The power control unit 10G controls the power unit 10H. The power unit 10H is driven under the control of the power control unit 10G.

The output unit 10A outputs information. In the embodiment, the output unit 10A outputs estimation result information indicating an estimation result of the motion of the camera 10B estimated by the camera motion estimation device 20.

The output unit 10A has a communication function transmit the estimation result information, a display function to display the estimation result information, a sound output function to output a sound indicating the estimation result information, and the like. The output unit 10A includes at least one of a communication unit 10D, a display 10E, and a speaker 10F. Note that, in the embodiment, it will be described a configuration in which the output it 10A has the communication unit 10D, the display 10E, and the speaker 10F as an example.

The communication unit 10D transmits the estimation result information to another device. For example, the communication unit 10D transmits the estimation result information to another device via a communication line. The display 10E displays information about an estimation result. The display 10E is a liquid crystal display (LCD), a projection device, a light, or the like. The speaker 10F outputs a sound indicating the information about the estimation result.

The camera 10B is a monocular camera, a stereo camera, an infrared camera, or the like. The camera 10B captures time series images around the moving object 10. The time series image may be monochrome or color. The camera 10B captures the time series images by capturing the vicinity of the moving object 10 in chronological order. The vicinity of the moving object 10 is, for example, an area within a predetermined range from the moving object 10. This range is, for example, a range that can be captured by the camera 10B.

In the embodiment, a case where the camera 10B is installed to include the front of the moving object 10 as a capturing direction will be described as an example. That is, in the embodiment, the camera 10B captures the front of the moving object 10 in chronological order. Further, in the embodiment, it will be described a case in which the camera 10B is a monocular color camera as an example.

The sensor 10C is a sensor that measures measurement information. The measurement information includes, for example, the position and posture of the moving object 10 on which the camera 10B is mounted, the speed of the moving object 10, and the steering angle of a steering wheel of the moving object 10. The sensor 10C is an inertial measurement unit (IMU), a speed sensor, a steering angle sensor, and the like. The IMU measures measurement information including triaxial acceleration and triaxial angular velocity of the moving object 10. That is, the IMU can measure the position and posture of the moving object 10 on which the camera 10B is mounted. The speed sensor measures the speed from an amount of rotation of a tire. The steering angle sensor measures the steering angle of the steering wheel of the moving object 10.

Next, it will be described an example of a functional configuration of the moving object 10 of the embodiment in detail.

Example of Functional Configuration

Figure 2:
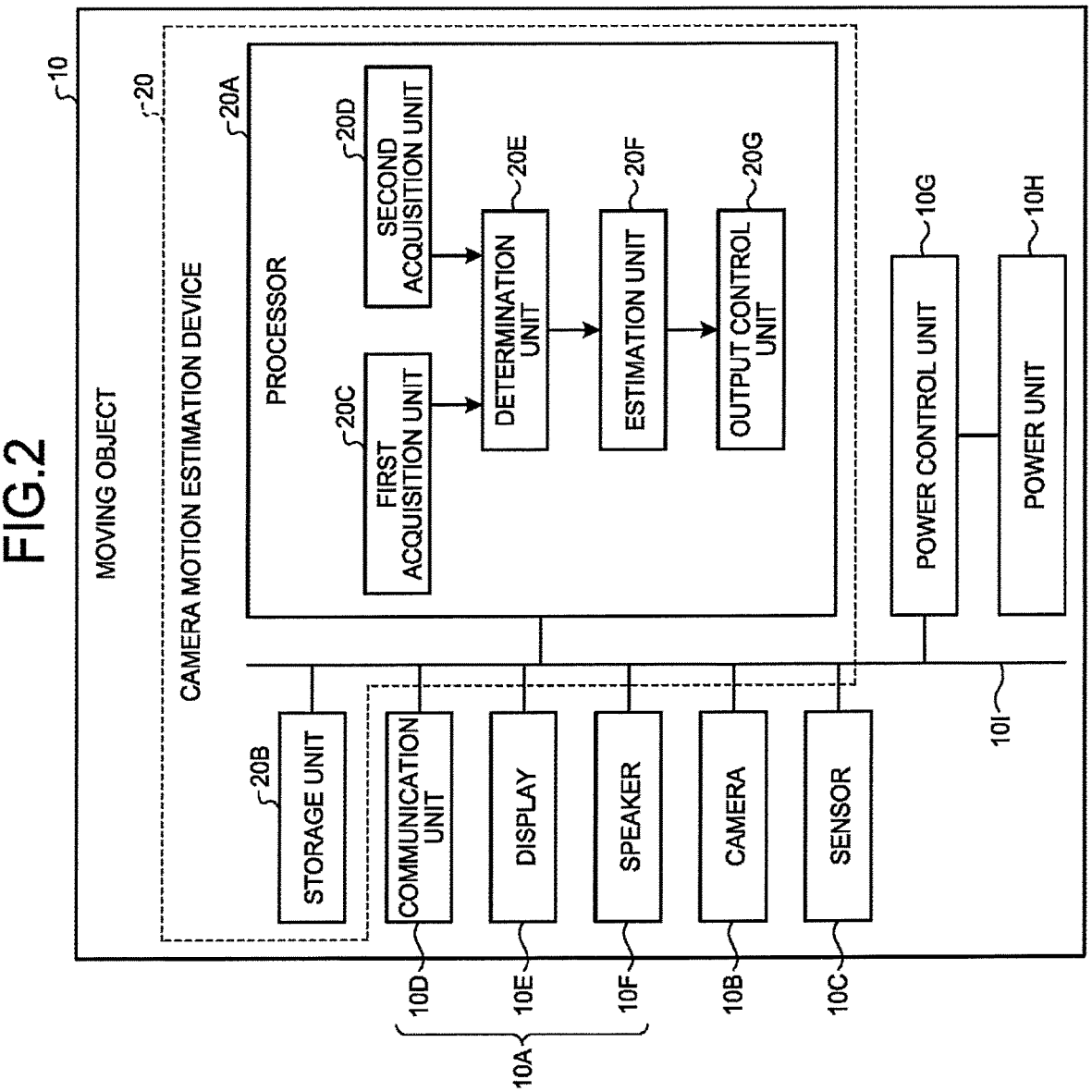
FIG. 2 is a diagram illustrating an example of a functional configuration of the moving object according to the embodiment.

FIG. 2 is a diagram illustrating an example of a functional configuration of the moving object 10.

The moving object 10 includes the camera motion estimation device 20, the output unit 10A, the camera 10B, the sensor 10C, the power control unit 10G, and the power unit 10H. The camera motion estimation device 20 includes a processor 20A and a storage unit 20B. The output unit 10A includes the communication unit 10D, the display 10E, and the speaker 10F.

The processor 20A, the storage unit 20B, the output unit 10A, the camera 10B, the sensor 10C, and the power control unit 10G are connected via a bus 10I. The power unit 10H is connected to the power control unit 10G.

Note that the output unit 10A (the communication unit 10D, the display 10E and the speaker 10F), the camera 10B, the sensor 10C, the power control unit 10G, and the storage unit 20B may be connected via a network. A communication method of the network used for the connection may be a wired method or a wireless method. Further, the network used for the connection may be realized by a combination of the wired method and the wireless method.

The storage unit 20B stores information. The storage unit 20B is a semiconductor memory device, a hard disk, an optical disk, or the like. The semiconductor memory device is, for example, a random access memory (RAM) and a flash memory. Note that the storage unit 20B may be a storage device provided outside the camera motion estimation device 20. Further, the storage unit 20B may be a storage medium. Specifically, the storage medium may store or temporarily store a program and various types of information downloaded via a local area network (LAN) or the Internet. Further, the storage unit 20B may be configured with a plurality of storage media.

The processor 20A includes a first acquisition unit 20C, a second acquisition unit 20D, a determination unit 20E, an estimation unit 20E, and an output control unit 20G. The first acquisition unit 20C, the second acquisition unit 20D, the determination unit 20E, the estimation unit 20F, and the output control unit 20G are realized by one or a plurality of processors, for example.

The processor 20A may be realized by causing a processor such as a central processing unit (CPU) to execute a program, that is, by software. Further, for example, the processor 20A may be a processor such as a dedicated integrated circuit (IC), that is, by hardware. Further, for example, the processor 20A may be realized by using software and hardware in combination.

The term "processor" used in an embodiment includes, for example, a CPU, a graphical processing unit (GPU), an application specific integrated circuit (ASIC), and a programmable logic device. The programmable logic device includes, for example, a simple programmable logic device (SPLD), a complex programmable logic device (CPLD), and a field programmable gate array (FPGA).

The processor realizes the processor 20A by reading and executing the program stored in the storage unit 20B. Note that the program may be directly incorporated into a circuit of the processor instead of being stored in the storage unit 20B. In this case, the processor realizes the processor 20A by reading and executing the program incorporated in the circuit.

The first acquisition unit 20C detects a pixel having large change in luminance from surrounding pixels, as a feature point, for each time series image. Then, the first acquisition unit 20C acquires feature point correspondence information indicating correspondence between feature points included in time series images.

Example of Correspondence of Feature Point

Figure 3:
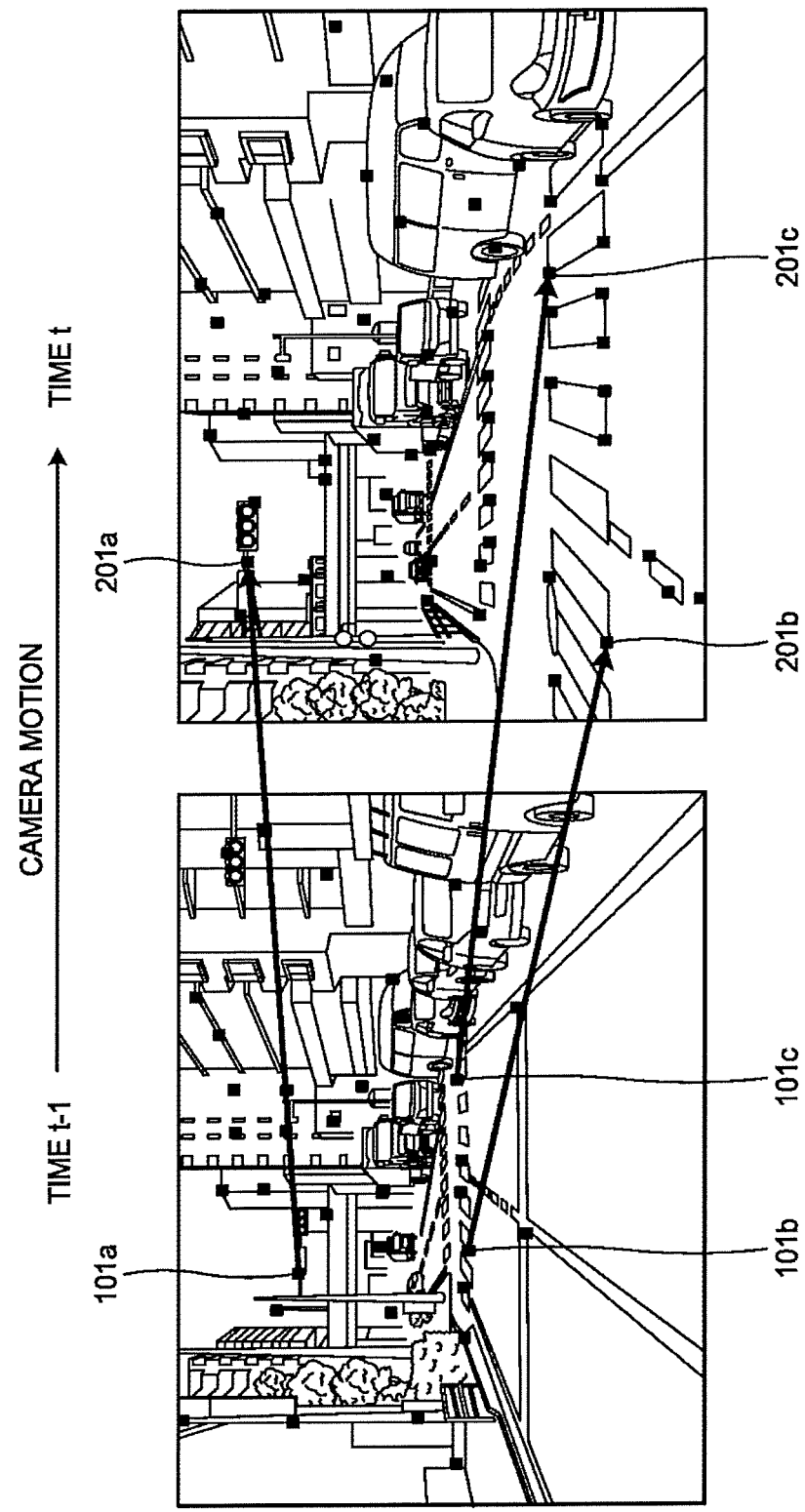
FIG. 3 is a view for describing an example of feature point correspondence.

FIG. 3 is a diagram for describing an example of feature point correspondence. An image captured by the camera 10B at a time t−1 includes a feature point 101. An image captured by the camera 10B at a time t includes a feature point 201. FIG. 3 illustrates a case in which a feature point 101a and a feature point 201a correspond to each other, a feature point 101b and a feature point 201b correspond to each other, and a feature point 101c and a feature point 201c correspond to each other, as correspondence examples between the feature points 101 and 201.

Here, it will be described an example of processing of making the feature points correspond to each other. First, the first acquisition unit 20C calculates a feature vector F having pixels around the detected feature point as components. Note that the component of the feature vector F may be information indicating a feature of the feature point, rather than pixel arrangement itself. The information indicating a feature of the feature points is, for example, information abstracting and expressing the difference in luminance of a surrounding area of the feature point with 0 or 1.

Next, the first acquisition unit 20C causes a feature vector $F_{t-1}$ of the feature point 101 included in the image captured at the time t−1 to correspond to the feature point 201 at the time t having a feature vector $F_t$ closest in distance to the feature vector $F_{t-1}$. Next, the first acquisition unit 20C inputs feature point correspondence information indicating the correspondence between the feature point 101 included in the image captured at the time t−1 and the feature point 201 included in the image captured at the time t to the determination unit 20E. The feature point correspondence information includes, for example, information in which coordinates of the feature point 101 included in the image captured at the time t−1 and coordinates of the feature point 201 included in the image captured at the time are associated with each other.

Note that, in the example of FIG. 3 above, it has been described a case of causing the feature point 101 included in the image captured at the time t−1 to correspond to the feature point 201 included in the image captured at the time t. However, the first acquisition unit 20C may acquire not only one piece of the feature point correspondence information obtained from a set of images but also a plurality of pieces of the feature point correspondence information from combinations of a plurality of images. For example, the first acquisition unit 20C may acquire the feature point correspondence information from not only the set of the image captured at the time t−1 and the image captured at the time t but also a set of an image captured at a time t−2 and the image captured the time t.

Further, the first acquisition unit 20C may acquire feature point correspondence information including candidates of a plurality of feature points 201 corresponding to the feature point 101 in order of the feature vector $F_t$ having closer in distance to the feature vector $F_{t-1}$. For example, the first acquisition unit 20C may acquire the feature point correspondence information in which the feature point 201 having the feature vector $F_t$ closest in distance between the feature vectors $F_{t-1}$ and $F_t$ and the feature point 201 having the feature vector $F_t$ second closest in distance between the feature vectors $F_{t-1}$ and $F_t$ are caused to correspond to the feature point 101 having the feature vector $F_{t-1}$.

Further, in a case of causing the candidates of the plurality of feature points 201 to correspond to the feature point 101, the first acquisition unit 20C may include likelihoods of the candidates of the plurality of feature points 201 in the feature point correspondence information. The likelihood is, for example, is a reciprocal of the distance between the feature vectors $F_{t-1}$ and $F_t$.

Further, for example, the likelihood is a ratio of the distance between the feature vector $F_t$ closest in distance between the feature vectors $F_{t-1}$ and $F_t$ and the feature vector $F_t$ second closest in distance between the feature vectors $F_{t-1}$ and $F_t$. That is, the likelihood of the feature point 201 having the feature vector $F_t$ can be considered to be higher, as the feature vector $F_t$ closest in distance between the feature vectors $F_{t-1}$ and $F_t$ and the feature vector $F_t$ second closest in distance between the feature vectors $F_{t-1}$ and $F_t$ are more different.

Note that a value indicating the likelihood may indicate that the likelihood is larger as the value is larger or may indicate that the likelihood is smaller as the value is smaller. In an embodiment, it will be described a case in which the likelihood is larger as the value is larger. Not that, in a case where the likelihood is smaller as the value is smaller by using the distance between the feature vectors $F_{t-1}$ and $F_t$ as it is for the likelihood, the sign of inequality of a threshold of determination processing described below is reversed.

Returning to FIG. 2, the second acquisition unit 20D acquires pixel flow information indicating the loci of the pixels included in the time series image.

Example of Flow of Pixels

Figure 4:
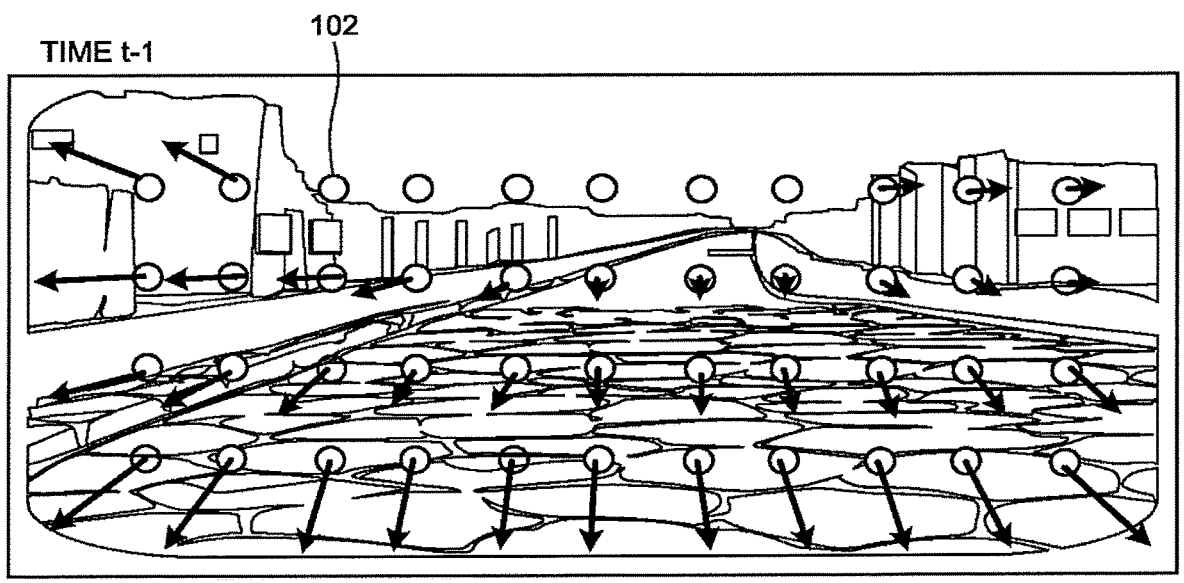
FIG. 4 is a view for describing an example of a flow (locus) of a pixel of the embodiment.

FIG. 4 is a diagram for describing an example of flows (loci) of pixels of an embodiment. The second acquisition unit 20D acquires loci of pixels indicating which pixel in the image at the time t−1 becomes which pixel at which position in the image at the current time t, for all pixels 102 included in the image at the time t−1. Note that, in the example of FIG. 4, for the sake of simplicity, only loci of the pixels 102 displayed at equal intervals are illustrated. However, in reality, loci of all the pixels included in the image are obtained.

Here, it will be describe described two examples of processing of acquiring pixel flow information.

The first method of acquiring pixel flow information is a method using a neural network. An input of the neural network is, for example, time series two images (the image captured at the time t−1 and the image captured at the current time t). Further, an output of the neural network is loci of pixels from positions of pixels in the image at the time t−1 to positions of pixels corresponding to them in the image at the current time t.

In the method using the neural network, a filter learns to output a flow, thereby to calculate flows of all the pixels. To be specific, in the neural network, representative portions are extracted from a filtered image, which is obtained by filtering an image, and the image size is reduced and then the reduced image is further filtered. The representative portions extracted from the filtered image are determined from information obtained through learning by the neural network. Filtering the reduced image enables filtering a relatively large region in the image even if the filter size is not changed, whereby use of global information becomes possible. In the neural network, after the filtering processing and the reduction processing are performed a specified number of times or more, the enlargement processing and the filtering processing are performed to get the size of the image back to the original size.

Here, it has been described the example in which the result of filtering is an image. However, the result of filtering may be expressed as filter data in which arrangement is simply determined. That is, in a case of using the neural network, the second acquisition unit 20D repeats processing of generating filter data by applying filter to an image, the filter having learned to output flows (loci) of pixels, and processing of reducing and increasing the filter data, a specified number of times or more, and then performs processing of returning the reduced and increased filter data to the number of locus data by the number of pixels of the original image.

The second method of acquiring pixel flow information is a method of using the estimation result information of the motion of the camera 10B obtained in the past and a three-dimensional position of an object.

Figure 5:
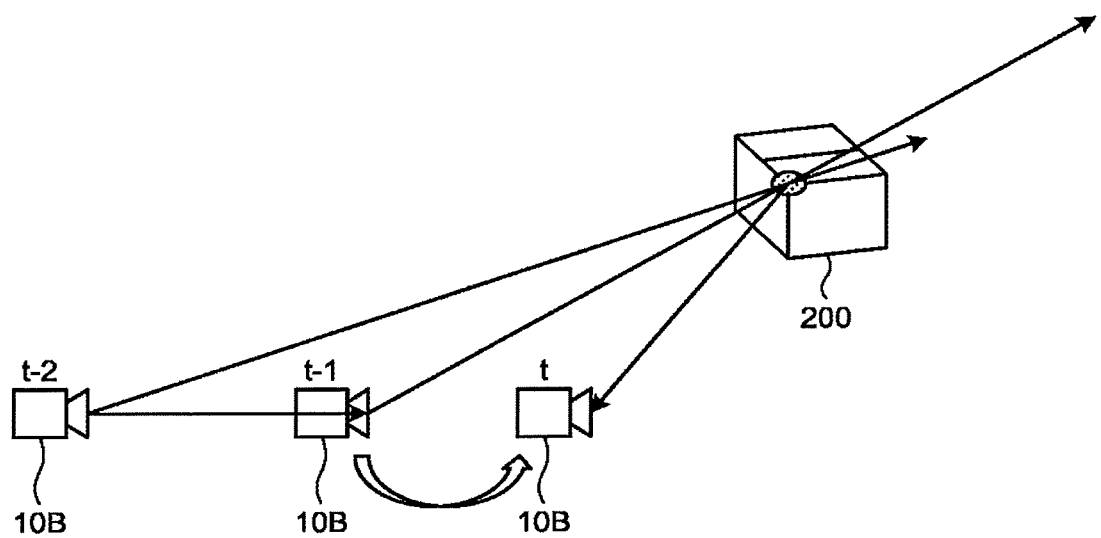
FIG. 5 is a diagram for describing a relationship between a camera motion and a three-dimensional position of an object according to the embodiment.

FIG. 5 is a diagram for describing a relationship between a camera motion and a three-dimensional position of an object 200 according to an embodiment. First, the second acquisition unit 20D calculates a three-dimensional position of the object 200 by triangulation or the like from the positions and postures of the camera 10B at the time t−2 and the time t−1, a pixel indicating an image of the object 200 included in an image captured at the time t−2, and a pixel indicating an image of the object 200 included in an image captured at the time t−1.

Next, the second acquisition unit 20D assumes a motion model from the positions and postures of the camera 10B at the time t−2 and the time t−1 to estimate the position and posture of the camera 10B at the current time t. The motion model is, for example, a uniformly accelerated motion and a uniform motion.

Next, the second acquisition unit 20D projects the three-dimensional position of the object 200 on the image captured at the position and posture of the camera 10B at the current time t. With the above operation, the second acquisition unit 20D can acquire the flow (locus) of the pixel indicating the image of the object 200.

Note that the second acquisition unit 20D may estimate the position and posture of the camera 10B at the current time t, using the sensor 10C.

Returning to FIG. 2, the determination unit 20F calculates a feature point moving vector indicating movement of the feature point, from the above-described feature point correspondence information. Further, the determination unit 20E calculates a pixel moving vector indicating movement of the pixel where the feature point used for calculation of the feature point moving vector is positioned, from the above-described pixel flow information. Then, the determination unit 20E determines similarity between the feature point moving vector and the pixel moving vector.

Figure 6:
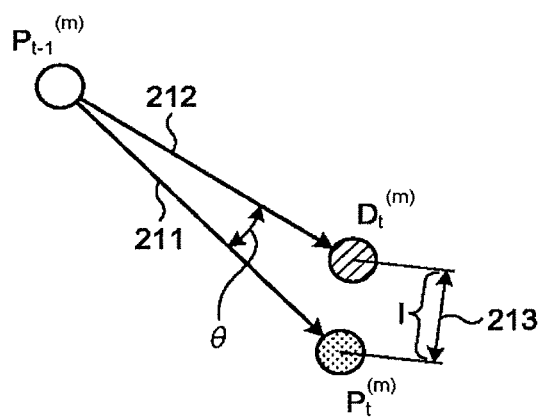
FIG. 6 is a diagram for describing a determination example of similarity between a feature point moving vector and a pixel moving vector according to the embodiment.

FIG. 6 is a diagram for describing a determination example of similarity between a feature point moving vector 211 and a pixel moving vector 212 according to the embodiment. $P_{t-1}^{(m)}$ indicates a position of a pixel indicating a feature point m included in an image at time t−1. $P_t^{(m)}$ indicates a position of a feature point m on an image at the time t having a feature vector $F_t$ most similar to a feature vector $F_{t-1}$ of the feature point m included in the image at the time t−1. That is, $P_t^{(m)}$ indicates the position of the feature point m on the image at the time t obtained from the above-described feature point correspondence information. $D_t^{(m)}$ indicates a position of a pixel indicating a feature point m at the time t obtained from $P_{t-1}^{(m)}$ according to the above-described pixel flow information.

Here, the reason why the feature point moving vector 211 and the pixel moving vector 212 are shifted as illustrated in FIG. 6 will be described. Ideally, the feature point moving vector 211 of the feature point 201 obtained from the feature point correspondence information acquired by the first acquisition unit 20C, and the pixel moving vector 212 of the pixel indicating the position of the feature point 201 obtained from the pixel flow information acquired by the second acquisition unit 20D are matched. However, as described above, the second acquisition unit 20D calculates the flow of the pixel from global information around the pixel obtained by filtering the image, and assumes the motion of the camera 10B to calculate the flow of the pixel. That is, in the processing of the second acquisition unit 20D, correspondence between the pixels is not directly obtained as correspondence between the points. Therefore, complete match of the feature point moving vector 211 and the pixel moving vector 212 less occurs.

Next, it will be described an example of a method of determining similarity by the determination unit 20E.

Use of Vector Direction

The determination unit 20E determines that the similarity is larger as an angle θ between the feature point moving vector 211 and the pixel moving vector 212 is smaller. Further, for example, the determination unit 20E determines that the feature point moving vector 211 and the pixel moving vector 212 are similar, when the angle θ between the feature point moving vector 211 and the pixel moving vector 212 is equal to or smaller than a threshold a. The determination unit 20E determines that the feature point moving vector 211 and the pixel moving vector 212 are not similar, when the angle θ between the feature point moving vector 211 and the pixel moving vector 212 is larger than the threshold a.

Note that the determination unit 20E may set similarity 1 to the case where the vectors are similar and set similarity 0 to the case where the vectors are not and express the similarity by binary values.

Use of Vector Length

For example, the determination unit 20E determines that the feature point moving vector 211 and the pixel moving vector 212 are similar when a length l of a vector 213 indicating a difference between the feature point moving vector 211 and the pixel moving vector 212 is smaller than a product of a length $L_p$ of the feature point moving vector 211 and a distance ratio constant b (0<b≤1). The determination unit 20E determines that the feature point moving vector 211 and the pixel moving vector 212 are not similar when the length l of the vector 213 indicating the difference is equal to or larger than the product of the length $L_p$ of the feature point moving vector 211 and the distance ratio constant b.

Note that the determination unit 20E may determine whether the feature point moving vector 211 and the pixel moving vector 212 are similar, using a length $L_D$ of the pixel moving vector 212, instead of the length $L_p$ of the feature point moving vector 211. Further, the determination unit 20E may determine whether the feature point moving vector 211 and the pixel moving vector 212 are similar, using the length $L_p$ of the feature point moving vector 211 and the length $L_D$ of the pixel moving vector 212.

Further, the determination unit 20E may determine whether the feature point moving vector 211 and the pixel moving vector 212 are similar, using both the direction and the length of the vectors. In that case, the determination unit 20E may determine that the feature point moving vector 211 and the pixel moving vector 212 are similar when all of a plurality of conditions (θ<a, l<b$L_p$, and l<b$L_D$) are satisfied. Alternatively, for example, the determination unit 20E may determine that the feature point moving vector 211 and the pixel moving vector 212 are similar when any one of the plurality of conditions (θ<a, l<b$L_p$, and l<b$L_D$) is satisfied.

Further, in a case where candidates of a plurality of the feature points 201 having different likelihoods is included in the feature point correspondence information, the determination unit 20E determines the similarity in order from the candidate of the feature point 201 having a larger likelihood. Then, when the similarity is determined to be less than a threshold, the determination unit 20E determines the similarity of the candidate of the feature point 201 having the next largest likelihood. For example, in a case where candidates of two feature points 201 having different likelihoods are included in the feature point correspondence information, the determination unit 20E first determines the similarity of the candidate of the feature point 201 having a larger likelihood. Then, when the similarity is determined to be less than the threshold, the determination unit 20E determines the similarity of the candidate of the feature point 201 having a smaller likelihood. As a result, the candidate of the feature point 201 having the likelihood that is not the maximum can also be used as the feature point 201 corresponding to the feature point 101, as long as the similarity is equal to or larger than the threshold. That is, even the candidate of the feature point 201 determined not to be similar according to a conventional method using only the feature point correspondence information can be used as the feature point 201 corresponding to the feature point 101, as long as the similarity considering the pixel flow information is equal to or larger than the threshold.

Note that the determination unit 20E may determine the similarity not only between the time t−1 and the time t but also by combinations of a plurality of times, such as between the time t−1 and the time t, and between the time t−2 and the time t.

Note that the feature point correspondence information of the combinations of a plurality of times to be used for determination of the similarity may be acquired by the first acquisition unit 20C, for example. Further, for example, the feature point correspondence information of the combinations of a plurality of times to be used for determination of the similarity may be obtained by storing the determination results (correspondence of the feature points), which have been determined to be similar between adjacent times by the determination unit 20E, and associating the plurality of determination results. For example, the determination unit 20E may obtain the determination result between the time t−2 and the time t by associating the determination result between the time t−2 and the time t−1 and the determination result between the time t−1 and the time t in a case where the feature point of the time t−1 is the same.

Similarly, the pixel flow information of the combinations of a plurality of times to be used for determination of the similarity may be acquired by the second acquisition unit 20D, for example. Further, for example, the pixel flow information of the combinations of a plurality of times to be used for determination of the similarity may be obtained by storing the pixel flow information between adjacent times used for determination by the determination unit 20E, and associating the pixel flow information between a plurality of the adjacent times. For example, the determination unit 20E may obtain the pixel flow information between the time t−2 and the time t by associating the pixel flow information between the time t−2 and the time t−1 and the pixel flow information between the time t−1 and the time t by the same pixel at the time t−1.

Further, the determination unit 20E may determine similarity between a vector indicating a sum of a predetermined number of the feature point moving vectors 211 obtained between time series images, and a vector indicating a sum of a predetermined number of the pixel moving vectors 212 obtained between time series images. For example, in a case where the predetermined number is two, the determination unit 20E may determine the similarity, using a vector indicating a sum of the feature point moving vectors 211 the time t−2 and the time t−1 and the feature point moving vectors 211 at the time t−1 and the time t, and a vector indicating a sum of the pixel moving vectors 212 at the time t−2 and the time t−1, and the pixel moving vectors 212 at the time t−1 and the time t.

Returning to FIG. 2, in a case where the similarity determined by the determination unit 20E is equal to or larger than the threshold, the estimation unit 20F estimates the motion of the camera that has captured the time series images, from the correspondence between the time series images of the feature point used for calculation of the feature point moving vector 211. The estimation unit 20F estimates the motion of the camera that has captured the image at the time t−1 and the image at the time t, from the correspondence between the feature point 201 at the time t used for calculation of the feature point moving vector 211, and the feature point 101 at the time t−1. Note that the estimation unit 20F may estimate the motion of the camera 10B that has captured the time series images, using a plurality of feature point correspondences, such as between the time t−2 and the time t−1 and between the time t−1 and the time t.

Note that a specific method of estimating the motion of the camera 10B may be arbitrary. In a case where a plurality of feature point correspondences and the three-dimensional position of the feature point have been obtained, for example, the estimation unit 20F estimates a motion such that a difference between the plurality of feature point correspondences and a projection position of a feature point calculated from an initial position of a motion estimated from a past motion of the camera 10B becomes smallest, and outputs a motion at the point of time when the difference converges as an estimation result. Further, for example, in a case where the three-dimensional position of the feature point has not been obtained, the estimation unit 20F estimates the motion of the camera 10B, using the epipolar constraint.

In a case where the number of the feature points included in the feature point correspondence information is equal to or larger than a number threshold, the estimation unit 20F may estimate the motion of the camera 10B that has captured the time series images from the correspondence of the feature points included in the feature point correspondence information without using the pixel flow information. Note that the processing of determining whether the number of the feature points is equal to or larger than the number threshold is executed by the above-described determination unit 20E, for example.

Further, in a case where likelihood of the feature point is included in the feature point correspondence information, and in a case where the number of the feature points having likelihood that is equal to or larger than a likelihood threshold is equal to or larger than the number threshold, the estimation unit 20F may estimate the motion of the camera 10B that has captured the time series images from the correspondence of the feature points included in the feature point correspondence information without using the pixel flow information. Note that the processing of determining whether the number of the feature points having likelihood that is equal to or larger than the likelihood threshold is equal to or larger than the number threshold is executed by the above-described determination unit 20E, for example.

Note that, in a case where likelihoods of the feature points are included in the feature point correspondence information, and in a case where the likelihood is equal to or larger than the likelihood threshold for each feature point, the estimation unit 20F may estimate the motion of the camera 10B that has captured the time series images from the correspondence of the feature points included in the feature point correspondence information without using the pixel flow information. Note that the processing of determining whether the likelihood is equal to or larger than the likelihood threshold is executed by the above-described determination unit 20E, for example.

The output control unit 20G outputs the estimation result information indicating the motion of the camera 10B estimated by the estimation unit 20F to the output unit 10A and the power control unit 10G.

Note that information indicating whether the motion of the camera 10B is estimated using the pixel flow information and the feature point correspondence information may be included in the estimation result information. Thus, the output unit 10A can output information indicating a state where the motion of the camera 10B is estimated from only the feature point correspondence information, or indicating a state where the motion of the camera 10B is estimated from the pixel flow information and the feature point correspondence information.

The power control unit 10G controls the power unit 10H according to the estimation result information received from the output control unit 20G. For example, the power control unit 10G may generate a power control signal for controlling the power unit 10H and control the power unit 10H according to the estimation result information. The power control signal is a control signal for controlling a drive unit that performs driving regarding traveling of the moving object 10 in the power unit 10H. To be specific, the power control unit 10G may control power to assist an avoidance operation to avoid the object 200 as an obstacle from the position of the moving object 10 on which the camera 10B is mounted, the position being identified from the estimation result information, and the three-dimensional position of the object 200 used for estimation of the motion of the camera 10B. The control of power to assist an avoidance operation is, for example, power control using a value for avoidance operation larger than a reference value, for increase/decrease value of the steering angle, power control supposed to apply the brake, and the like.

Note that the above-described functional configuration in FIG. 2 is an example, and the functional configuration may be changed. For example, the determination unit 20E and the estimation unit 20F may be realized by one functional block.

Next, it will be described an example of determination processing of the embodiment with reference to a flowchart.

Figure 7:
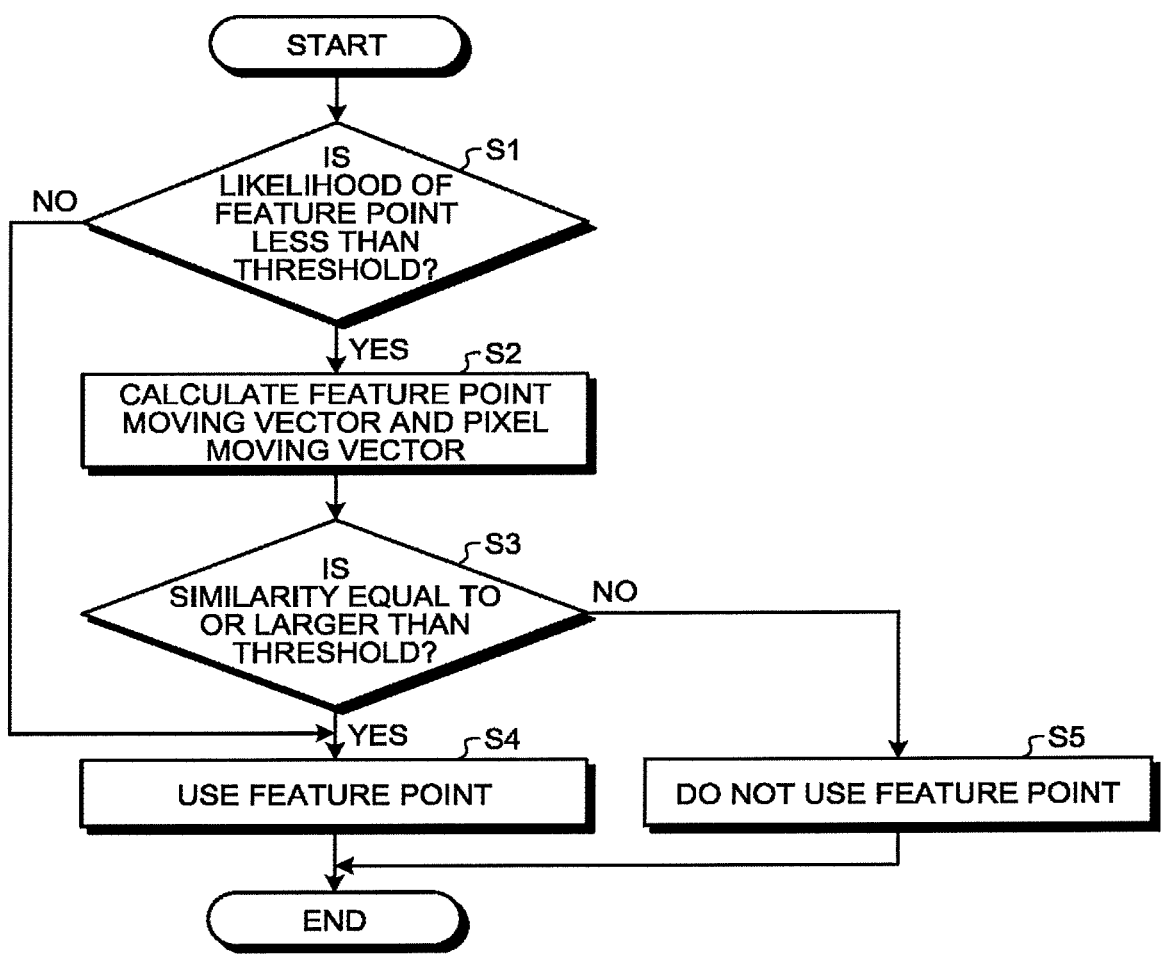
FIG. 7 is a flowchart illustrating an example of determination processing according to the embodiment.
Figure 8:
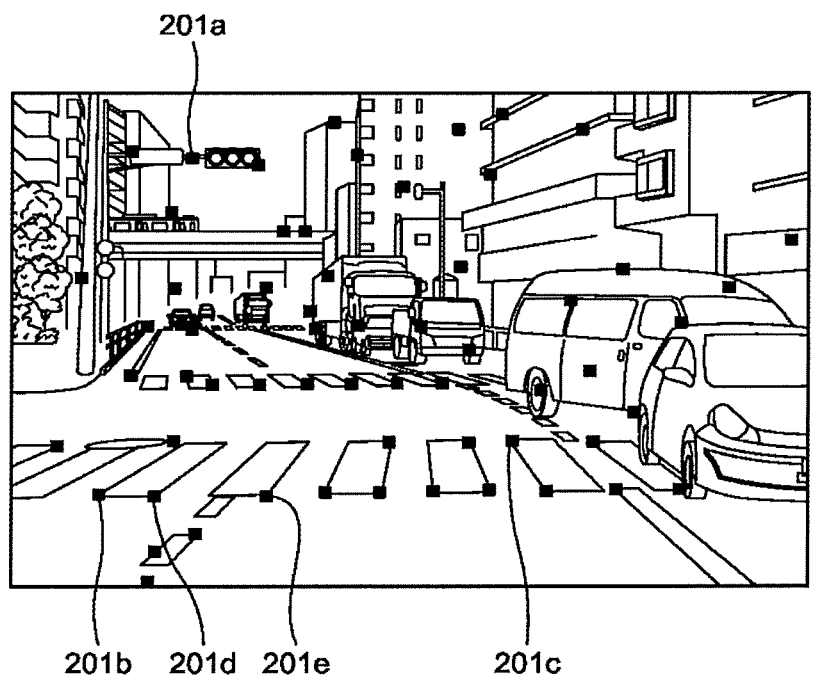
FIG. 8 is a view for describing an example of effects of the embodiment.

FIG. 7 is a flowchart illustrating an example of determination processing according to the embodiment. In the example of FIG. 1, a case in which the feature point 101 included in the image captured at the time t−1 and the feature point 201 included in the image captured at the time t are caused to correspond to each other will be described.

First, the determination unit 20E determines whether the likelihood of the feature point 201 included in the image captured at the time t is less than the threshold (step S1).

When the likelihood of the feature point 201 is less than the threshold (step S1, Yes), the determination unit 20E calculates the feature point moving vector 211 and the pixel moving vector 212 described above (step S2). Next, the determination unit 20E determines whether the similarity between the feature point moving vector 211 and the pixel moving vector 212 calculated in the processing of step S2 is equal to or larger than the threshold (step S3).

When the similarity of the feature point 201 is not equal to or larger than the threshold (step S3, No), the estimation unit 20F does not use the feature point 201 determined not to be equal to or larger than the threshold in the processing of step S3, for estimation of the motion of the camera 10B (step S5).

When the likelihood of the feature point 201 is not less than the threshold (step S1, No), or when the similarity of the feature point 201 is equal to or larger than the threshold (step S3, Yes), the estimation unit 20F estimates the motion of the camera 10B, using the feature point 201 (step S4).

Example of Effects

FIG. 6 is a view for describing an example of effects of the embodiment. Feature points 201$d$ and 201$e$ included in the image captured at the time t are edge portions of a crosswalk on a road. However, since circumstances are similar, there is a possibility that correspondence with the feature point 101 included in the image captured at the time t−1 cannot be uniquely obtained. Therefore, the likelihoods of the feature points 201$d$ and 201$e$ are lower than the threshold, and there is a possibility that the feature points 201$d$ and 201$e$ are not used for estimation of the motion of the camera in a conventional method. On the other hand, in the camera motion estimation device 20 of the embodiment, even if the likelihood of the feature point 201$d$ is less than the threshold, the determination unit 20E uses the feature point 201$d$ for estimation of the camera motion if similarities of the feature point moving vector 211 based on the feature point correspondence information and the pixel moving vector 212 based on the pixel flow information are the threshold or more. The same applies to the feature point 201$e$. According to the camera motion estimation device 20 of the embodiment, the estimation accuracy of the camera motion can be improved even when many similar patterns exist in an image.

Finally, an example of a hardware configuration of the camera motion estimation device 20 according to the embodiment will be described.

Example of Hardware Configuration

Figure 9:
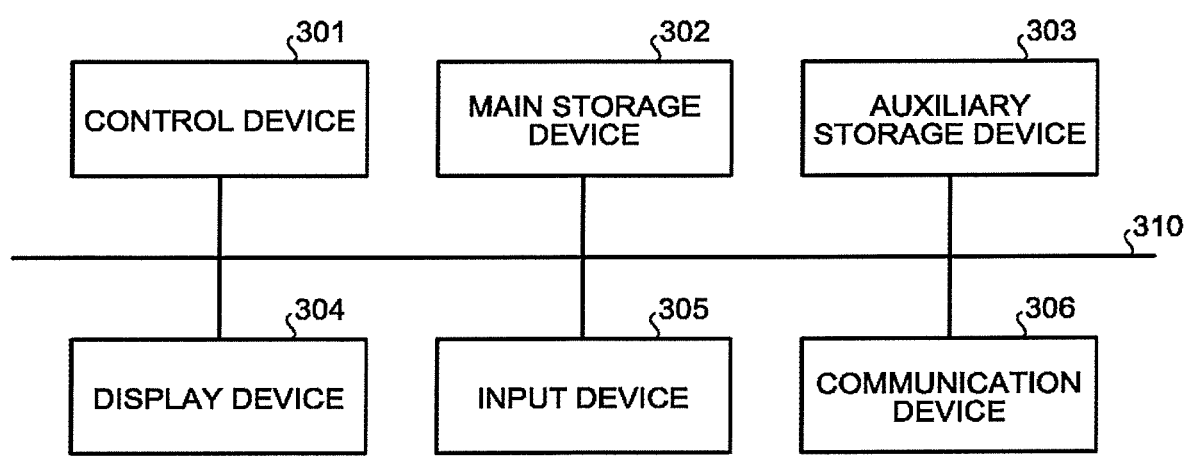
FIG. 9 is a diagram illustrating an example of a hardware configuration of a camera motion estimation device according to the embodiment.

FIG. 9 is a diagram illustrating an example of a hardware configuration of the camera motion estimation device 20 according to the embodiment. The camera motion estimation device 20 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected each other via a bus 310.

Note that the display device 304, the input device 305, and the communication device 306 may not be provided. For example, when the camera motion estimation device 20 is connected to another device, a display function, an input function, and a communication function of the another device may be used.

The control device 301 executes a program read from the auxiliary storage device 303 to the main storage device 302. The control device 301 is one or more processors such as a CPU. The main storage device 302 is a memory such as a read only memory (ROM) and a RAM. The auxiliary storage device 303 is a memory card, a hard disk drive (HDD), and the like.

The display device 304 displays information. The display device 304 is, for example, a liquid crystal display. The input device 305 receives an input of information. The input device 305 is, for example, a hardware key and the like. Note that the display device 304 and the input device 305 may be a liquid crystal touch panel or the like that serves both a display play function and an input function. The communication device 306 communicates with other devices.

The program executed by the camera motion estimation device 20 is stored in a file in an installable or executable format in a computer-readable storage medium such as a CD-ROM, a memory card, a CD-R, or a digital versatile disc (DVD) and provided as a computer program product.

Further, the program executed by the camera motion estimation device 20 may be stored on a computer connected to a network such as the Internet and provided by being downloaded via the network. Further, the program executed by the camera motion estimation device 20 may be provided via a network such as the Internet without being downloaded.

Further, the program executed by the camera motion estimation device 20 may be incorporated in ROM or the like in advance and provided.

The program executed by the camera motion estimation device 20 has a module configuration including functions realizable by the program, of the functions of the camera motion estimation device 20.

The functions realized by the program are loaded onto the main storage device 302 by the control device 301 reading and executing the program from the storage medium such as the auxiliary storage device 303. That is, the functions realized by the program are generated on the main storage device 302.

A part of the functions of the camera motion estimation device 20 may be realized by hardware such as an IC. The IC is, for example, a processor that executes dedicated processing.

In a case where the functions are realized using a plurality of processors, each processor may realize one of the functions or may realize two or more of the functions.

As described above, in the camera motion estimation device 20 of the embodiment, the first acquisition unit 20C acquires the feature point correspondence information indicating the correspondence between the feature points included in time series images. The second acquisition unit 20D acquires the pixel flow information indicating the locus of the pixel included in the time series images. Then, the determination unit 20E and the estimation unit 20F estimate the motion of the camera that has captured the time series images, using the pixel flow information and the feature point correspondence information.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A camera motion estimation device comprising:
   a movable object;
   a memory on the movable object; and
   one or more hardware processors on the movable object configured to function as a first acquisition unit, a second acquisition unit, and an estimation unit, wherein
   the first acquisition unit is configured to acquire feature point correspondence information indicating correspondence between feature points included in time series images,
   the second acquisition unit is configured to acquire pixel flow information indicating a locus of a pixel included in the time series image, and
   the estimation unit is configured to estimate a motion of a camera on the movable object that has captured the time series images, using the pixel flow information and the feature point correspondence information,
   wherein the feature point correspondence information includes likelihood of the feature points, and
   the estimation unit counts the number of feature points having the likelihood being equal to or larger than a third threshold, when the number of the feature points is equal to or larger than a fourth threshold, and the estimation unit estimates, without using the pixel flow information, the motion of the camera that has captured the time series images from correspondence of the feature points included in the feature point correspondence information.

2. The device according to claim 1, wherein
   the one or more processors are further configured to function as a determination unit configured to calculate a feature point moving vector indicating movement of the feature point from the feature point correspondence information, calculate a pixel moving vector indicating movement of a pixel where the feature point used for calculation of the feature point moving vector is positioned from the pixel flow information, and determine similarity between the feature point moving vector and the pixel moving vector, and wherein
   the estimation unit compares the similarity with a first threshold and estimates based on whether the similarity is above or below the threshold the motion of the camera that has captured the time series images, from correspondence of the feature point between the time series images, the feature point having been used for calculation of the feature point moving vector, in a case where the similarity is equal to or larger than the first threshold.

3. The device according to claim 1, wherein
   the second acquisition unit acquires the pixel flow information, using a neural network having the time series images as input and loci of pixels included in the images as output.

4. The device according to claim 3, wherein
   the neural network includes processing of returning the reduced and increased filter data to the number of locus data of the number of pixels of the original images, after repeating, a specified number of times or more, processing of generating filter data by applying a filter having learned to output loci of pixels to the images, and processing of reducing and increasing the filter data.

5. The device according to claim 1, wherein
   the second acquisition unit calculates a three-dimensional position of an object from a first pixel indicating the object included in the past time series image, calculates a second pixel indicating a position of the object in a position and a posture of the current camera predicted from a past motion of the camera, from the three-dimensional position, and acquires the pixel flow information by causing the first pixel and the second pixel to correspond to each other.

6. The device according to claim 1, wherein
   the second acquisition unit calculates a three-dimensional position of an object from a first pixel indicating the object included in the past time series image, identifies a position and a posture of the current camera from a position sensor indicating a position of the camera and a posture sensor indicating a posture of the camera, calculates a second pixel indicating a position of the object in the position and the posture of the current camera from the three-dimensional position, and acquires the pixel flow information by causing the first pixel and the second pixel to correspond to each other.

7. The device according to claim 1, wherein
   the one or more processors are further configured to function as an output control unit configured to output, to an output unit, information indicating whether estimating the motion of the camera that has captured the time series images, using the pixel flow information and the feature point correspondence information.

8. The device according to claim 1, wherein
the camera is mounted on a moving object, and
the camera motion estimation device wherein
the one or more processors are further configured to function as an output control unit configured to output information indicating the estimated motion of the camera to a power control unit that controls power that drives a drive unit of the moving object.

9. A camera motion estimation device comprising:
a movable object;
a memory on the movable object; and
one or more hardware processors on the movable object configured to function as a first acquisition unit, a second acquisition unit, and an estimation unit, wherein
the first acquisition unit is configured to acquire feature point correspondence information indicating correspondence between feature points included in time series images,
the second acquisition unit is configured to acquire pixel flow information indicating a locus of a pixel included in the time series image,
the estimation unit is configured to estimate a motion of a camera on the movable object that has captured the time series images, using the pixel flow information and the feature point correspondence information,
the one or more processors are further configured to function as a determination unit configured to calculate a feature point moving vector indicating movement of the feature point from the feature point correspondence information, calculate a pixel moving vector indicating movement of a pixel where the feature point used for calculation of the feature point moving vector is positioned from the pixel flow information, and determine similarity between the feature point moving vector and the pixel moving vector,
the estimation unit compares the similarity with a first threshold and estimates based on whether the similarity is above or below the threshold the motion of the camera that has captured the time series images, from correspondence of the feature point between the time series images, the feature point having been used for calculation of the feature point moving vector, in a case where the similarity is equal to or larger than the first threshold, and
wherein the determination unit determines that the similarity is larger as an angle between the feature point moving vector and the pixel moving vector is smaller.

10. A camera motion estimation device comprising:
a movable object;
a memory on the movable object; and
one or more hardware processors on the movable object configured to function as a first acquisition unit, a second acquisition unit, and an estimation unit, wherein
the first acquisition unit is configured to acquire feature point correspondence information indicating correspondence between feature points included in time series images,
the second acquisition unit is configured to acquire pixel flow information indicating a locus of a pixel included in the time series image,
the estimation unit is configured to estimate a motion of a camera on the movable object that has captured the time series images, using the pixel flow information and the feature point correspondence information,
the one or more processors are further configured to function as a determination unit configured to calculate a feature point moving vector indicating movement of the feature point from the feature point correspondence information, calculate a pixel moving vector indicating movement of a pixel where the feature point used for calculation of the feature point moving vector is positioned from the pixel flow information, and determine similarity between the feature point moving vector and the pixel moving vector,
the estimation unit compares the similarity with a first threshold and estimates based on whether the similarity is above or below the threshold the motion of the camera that has captured the time series images, from correspondence of the feature point between the time series images, the feature point having been used for calculation of the feature point moving vector, in a case where the similarity is equal to or larger than the first threshold, and
wherein the determination unit determines that the similarity is larger as a length of a vector indicating a difference between the feature point moving vector and the pixel moving vector is shorter.

11. The device according to claim 10, wherein
the determination unit determines that the similarity is larger than a second threshold when the length of the vector indicating the difference between the feature point moving vector and the pixel moving vector is smaller than a product of a length of the feature point moving vector and a distance ratio constant b ($0<b\leq1$), and determines that the similarity is equal to or smaller than the second threshold when the length of the vector indicating the difference is equal to or larger than the product of the length of the feature point moving vector and the distance ratio constant b.

12. The device according to claim 10, wherein
the determination unit determines that the similarity is larger than a second threshold when the length of the vector indicating the difference between the feature point moving vector and the pixel moving vector is smaller than a product of a length of the pixel moving vector and a distance ratio constant b ($0<b\leq1$), and determines that the similarity is equal to or smaller than the second threshold when the length of the vector indicating the difference is equal to or larger than the product of the length of the pixel moving vector and the distance ratio constant b.

13. A camera motion estimation device comprising:
a movable object;
a memory on the movable object; and
one or more hardware processors on the movable object configured to function as a first acquisition unit, a second acquisition unit, and an estimation unit, wherein
the first acquisition unit is configured to acquire feature point correspondence information indicating correspondence between feature points included in time series images,
the second acquisition unit is configured to acquire pixel flow information indicating a locus of a pixel included in the time series image,
the estimation unit is configured to estimate a motion of a camera on the movable object that has captured the time series images, using the pixel flow information and the feature point correspondence information,
the one or more processors are further configured to function as a determination unit configured to calculate a feature point moving vector indicating movement of the feature point from the feature point correspondence information, calculate a pixel moving vector indicating movement of a pixel where the feature point used for calculation of the feature point moving vector is positioned from the pixel flow information, and determine similarity between the feature point moving vector and the pixel moving vector, the estimation unit compares the similarity with a first threshold and estimates based on whether the similarity is above or below the threshold the motion of the camera that has captured the time series images, from correspondence of the feature point between the time series images, the feature point having been used for calculation of the feature point moving vector, in a case where the similarity is equal to or larger than the first threshold, wherein the feature point correspondence information includes candidates of a plurality of the feature points having different likelihoods, and the determination unit determines the similarity in order from a candidate of the feature point having larger likelihood, and determines the similarity of a candidate of the feature point having next largest likelihood when the similarity is determined to be less than the first threshold.

14. A camera motion estimation device comprising:

a movable object;

a memory on the movable object; and one or more hardware processors on the movable object configured to function as a first acquisition unit, a second acquisition unit, and an estimation unit, wherein the first acquisition unit is configured to acquire feature point correspondence information indicating correspondence between feature points included in time series images, the second acquisition unit is configured to acquire pixel flow information indicating a locus of a pixel included in the time series image, the estimation unit is configured to estimate a motion of a camera on the movable object that has captured the time series images, using the pixel flow information and the feature point correspondence information, the one or more processors are further configured to function as a determination unit configured to calculate a feature point moving vector indicating movement of the feature point from the feature point correspondence information, calculate a pixel moving vector indicating movement of a pixel where the feature point used for calculation of the feature point moving vector is positioned from the pixel flow information, and determine similarity between the feature point moving vector and the pixel moving vector, the estimation unit compares the similarity with a first threshold and estimates based on whether the similarity is above or below the threshold the motion of the camera that has captured the time series images, from correspondence of the feature point between the time series images, the feature point having been used for calculation of the feature point moving vector, in a case where the similarity is equal to or larger than the first threshold, and wherein the determination unit determines similarity between a vector indicating a sum of a predetermined number of the feature point moving vectors obtained between the time series images, and a vector indicating a sum of a predetermined number of the pixel moving vectors obtained between the time series images.

15. A camera motion estimation method comprising:

acquiring feature point correspondence information indicating correspondence between feature points included in time series images;

acquiring pixel flow information indicating a locus of a pixel included in the time series images; and estimating a motion of a camera on a movable object that has captured the time series images, using the pixel flow information and the feature point correspondence information, wherein the feature point correspondence information includes likelihood of the feature points, and the estimating counts the number of feature points having the likelihood being equal to or larger than a third threshold, when the number of the feature points is equal to or larger than a fourth threshold, and the estimation unit estimates, without using the pixel flow information, the motion of the camera that has captured the time series images from correspondence of the feature points included in the feature point correspondence information.

16. A computer program product comprising a non-transitory computer-readable medium including instructions, the instructions causing a computer to function as:

a first acquisition unit configured to acquire feature point correspondence information indicating correspondence between feature points included in time series images;

a second acquisition unit configured to acquire pixel flow information indicating a locus of a pixel included in the time series images; and an estimation unit configured to estimate a motion of a camera on a movable object that has captured the time series images, using the pixel flow information and the feature point correspondence information, wherein the feature point correspondence information includes likelihood of the feature points, and the estimation unit counts the number of feature points having the likelihood being equal to or larger than a third threshold, when the number of the feature points is equal to or larger than a fourth threshold, and the estimation unit estimates, without using the pixel flow information, the motion of the camera that has captured the time series images from correspondence of the feature points included in the feature point correspondence information.

* * * * *